Jan. 29, 1952 R. ADLER 2,583,720

FOLLOW-UP APPARATUS AND SYSTEM

Filed March 16, 1949 3 Sheets-Sheet 1

INVENTOR.
Robert Adler
BY.
Theiss, Olson & Mecklenburger,
Attys

INVENTOR.
Robert Adler
BY Thiess, Olson & Mecklenburger
Attys

Jan. 29, 1952 R. ADLER 2,583,720

FOLLOW-UP APPARATUS AND SYSTEM

Filed March 16, 1949 3 Sheets-Sheet 3

INVENTOR.
Robert Adler
BY
Thiess, Olson & Mecklenburger
attys

Patented Jan. 29, 1952 2,583,720

UNITED STATES PATENT OFFICE 2,583,720

FOLLOW-UP APPARATUS AND SYSTEM

Robert Adler, Chicago, Ill., assignor to Consolidated Electric Company, Chicago, Ill., a corporation of Illinois Application March 16, 1949, Serial No. 81,709

1 Claim. (Cl. 178—19)

This invention relates to servo type follow-up apparatus and systems, more particularly to such apparatus and systems wherein the transmitted signal has a frequency varying with the quantity to be transmitted, and it is an object of the invention to provide improved apparatus and systems of this character.

In follow-up apparatus motion produced at a transmitter is reproduced at a receiver spaced therefrom, such motion embodying within itself the intelligence to be transmitted, for example handwriting in tele-autographic apparatus; and in servo type follow-up mechanisms the receiver generates a local signal determined by the position of its follow-up element, which signal is compared with that received from the transmitter, and the position of the receiver follow-up element is corrected in accordance with the difference between the transmitted and local signals; that is, in accordance with the error signal.

It is a further object of the invention to provide an improved receiver for servo type follow-up apparatus of the character indicated, wherein an error signal is produced completely by passive circuits; that is, without the use of locally generated signals.

It is a further object of the invention to provide an improved receiver of the character indicated for tele-autographic apparatus and systems.

While the present invention is illustrated as, and is described in connection with a tele-autographic transmitting and receiving system, it will be understood that this is exemplary only and that the invention has application generally to servo type follow-up apparatus.

Tele-autographic apparatus utilizing a variable frequency signal to transmit the handwriting is known. In such known apparatus the motion of a directing member or stylus, which may be a writing member, at the transmitter is resolved into two components corresponding respectively to a pair of coordinates in a coordinate system. A signal of variable frequency corresponding to each component or coordinate is produced by an oscillator and is transmitted to the receiver. At the receiver, the handwriting is reproduced by combining two component or coordinate motions such as through the movements of a pair of arms linked together, the position of each arm being determined by one of the transmitted signals. In a well known system of this kind, local signals having frequencies determined by the position of the respective coordinate arms are generated and mixer circuits are used to produce the difference frequencies between these local signals and the respective incoming frequencies from the transmitter. Two suitable circuits, such as discriminators, produce direct current output voltages which vary in accordance with these difference frequencies, such output voltages representing the two respective error signals. The position of the receiver arms is continuously corrected according to these error signals.

It has been found that, in the mixer circuits which are necessary to produce the desired difference frequencies in systems of this character, a considerable variety of beat notes between harmonics of the various oscillators employed is produced. As the position of the arms is varied, relatively slow secondary beats may occur when the frequencies of two harmonics, each from a different oscillator, nearly coincide. Such slow beats lead to vibration of the receiving pen or stylus. Careful choice of frequency bands does not ordinarily eliminate all such effects. Reduction thereof to a minimum requires mixer circuits which are carefully balanced, as well as a relatively large number of filters, thereby making the number of required circuit components large and the system uneconomical. Particularly is this the case when it is desired to construct the system so that transmission may occur in either direction; this, in the known systems, requires substantial duplication of all equipment at the receiving and transmitting ends.

It has also been found that difficulties are experienced if the difference frequency signal employed to operate the frequency responsive or discriminator circuit is in the low audio frequency range. It is necessary to remove the difference frequency from the discriminator output in order to prevent buzzing of the receiving pen or stylus; but the filter networks employed for this purpose must not cause any delay or distortion of the desired error signal. For this reason, the difference frequency should be as high as possible so that it may be more easily separated from the error signal. This requirement conflicts with the other considerations, mentioned earlier, which affect the choice of frequencies, and no fully satisfactory comprise appears to be possible.

Accordingly, it is a further object of the invention to provide an improved receiver for a servo type follow-up apparatus of the character indicated in which the number of circuit components is reduced and improved operation, as well as an economical system, is obtained.

In carrying out the invention in one form, a follow-up system receiver, including a follow-up element which assumes a position corresponding to the frequency of a transmitted signal, is provided which comprises, a frequency responsive network for producing an actuating voltage for the follow-up element, the network including a passive frequency sensitive circuit, and the frequency sensitive circuit includes a variable element linked to the receiver follow-up element.

For a more complete understanding of the invention reference should be had to the accompanying drawings in which.

Figure 1:
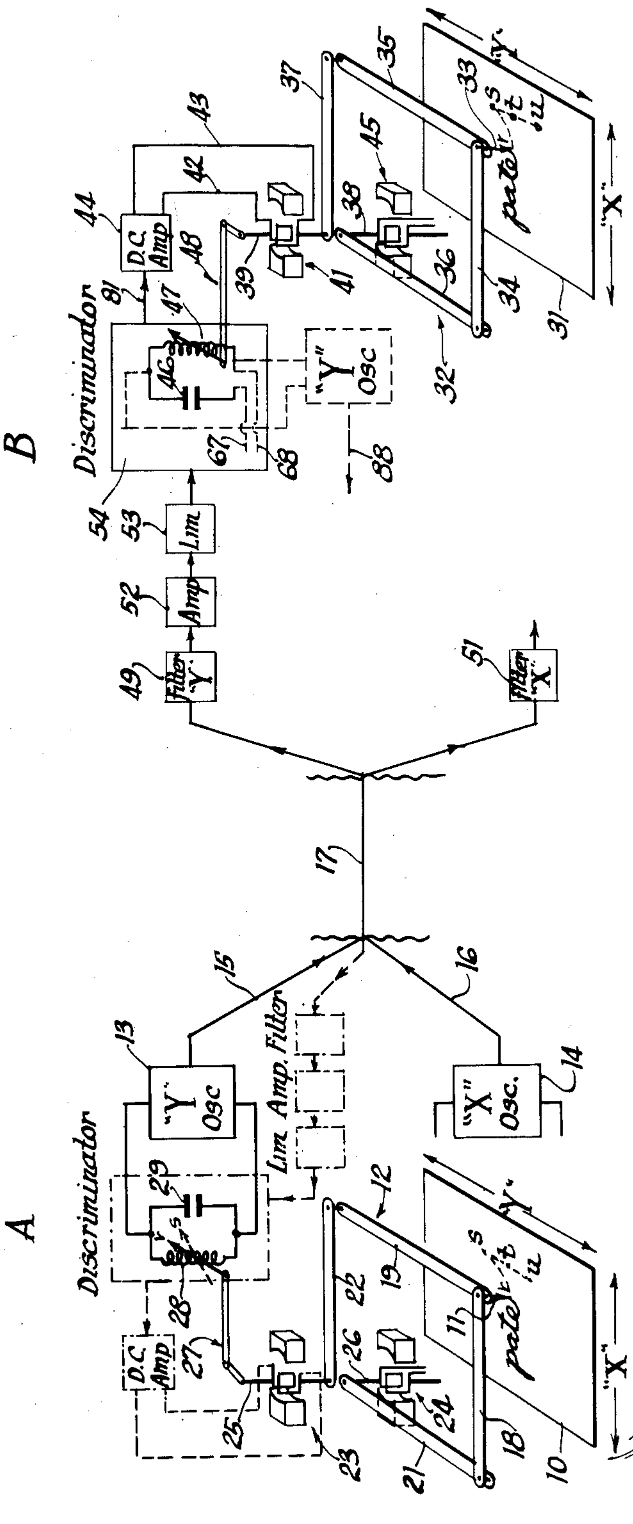
Figure 1 is a diagrammatic representation of tele-autographic apparatus embodying the invention.

Referring to the drawings, there is shown in Fig. 1 tele-autographic apparatus wherein two variable frequency signals transmit the writing which may be utilized to transmit and receive in either direction, the operation of the apparatus being described hereinafter, however, as though transmission were taking place from station A, i. e. the transmitter, and receiving were taking place at station B, i. e. the receiver.

Station A comprises a writing surface 10 having coordinates X and Y and a stylus 11 connected to a parallel arm linkage mechanism 12 by means of which the Y coordinate of stylus movement is utilized to vary the signal frequency of an oscillator 13, and the X component of movement is utilized to vary the signal frequency of an oscillator 14. Accordingly, movements of stylus 11 in writing produce correspondingly varying signal frequencies in oscillators X and Y, which signals are transmitted over conductors 15 and 16, and a transmission line 17, to receiving station B.

While a transmission line has been shown, it will be understood that this is exemplary and that wireless transmission may be used.

Linkage mechanism 12 comprises a pair of arms 18 and 19 pivoted at one of their ends to stylus 11, as shown, and a second pair of arms 21 and 22 pivoted at one of their ends, respectively, to the other ends of arms 18 and 19. The free ends of arms 21 and 22 may be adapted to lie on the same axis, but are not connected to each other. These ends of link members 21 and 22 are connected respectively to the coils of motor units 23 and 24 by means of shafts 25 and 26. Shaft 25 is connected through a suitable mechanical link 27 to the adjusting element of a variable inductor 28 which is electrically connected in parallel with a condenser 29 and to oscillator 13, the tuning of the circuit combination of inductor 28 and condenser 29 determining the frequency of this oscillator. Shaft 25 rotating with the corresponding end of link 22, it will be apparent that movements along the Y coordinate of writing surface 10 produce rotation of shaft 25 and consequently change the position of the adjusting arm of coil 28 thereby varying the frequency of oscillator 13.

Similarly, shaft 26 rotating with the corresponding end of link 21, movements of stylus 11 along the X coordinate vary the frequency of oscillator 14, although the frequency determining circuit and the mechanical connection for oscillator 14 are not shown in the interest of drawing simplicity.

It will be apparent that as the stylus is utilized in writing, movements of axles 25 and 26 take place thereby varying the frequencies of the Y and X oscillators, which frequencies are transmitted to receiver B.

Receiver B is similar to the transmitter in that a writing surface 31 having X and Y coordinates is provided, together with a parallelogram linkage system 32 for moving stylus 33 to reproduce the transmitted writing.

Linkage mechanism 32 comprises a pair of arms 34 and 35 pivoted at one of their ends to stylus 33 and a pair of arms 36 and 37 pivoted to the other ends, respectively, of arms 34 and 35. The free ends of arms 36 and 37 may be arranged to lie on the same axis and are not connected with each other, but are connected to separate axles 38 and 39 respectively. The axle 39 supports the moving coil of a motor unit 41, the coil of this motor unit being connected by means of conductors 42 and 43 to a D. C. amplifier 44. The shaft 38 supports the moving coil of a motor unit 45, the coil of which is also to be connected to a D. C. amplifier, not shown in the interest of simplicity.

The motor units at both transmitter and receiver are identical and comprise a magnetized stator, which, preferably, may employ permanent magnets and coils pivotally mounted therein, the coils being free to rotate in either direction.

Associated with the receiver is a tunable frequency sensitive circuit comprising the condenser 46 and the variable inductor 47 whose adjusting element is connected by means of a link 48 to shaft 39. Accordingly, when handwriting is being transmitted and stylus 33 moves to reproduce such, inductor 47 is adjusted in conformance therewith.

Signals transmitted over link 17 are filtered out at the receiving end by filters 49 and 51, these filters separating out the Y and X components, respectively.

After filter 49, the Y component signal may be amplified in amplifier 52 and passed through a limiter 53 for producing a constant output amplitude irrespective of the amplitude of the input signal. From limiter 53 the Y coordinate signal passes into a distriminator 54. This discriminator, shown only in block diagram form in Fig. 1, is a frequency responsive network which produces a direct current output voltage varying in a manner characteristic of this invention, to be described more fully subsequently in this specification. The voltage from discriminator 54 is amplifier in D. C. amplifier 44 and actuates the moving coil of motor unit 41, and consequently stylus 33, through links 37 and 35.

In a manner similar to that described, the X coordinate signal is filtered in filter 51 and passes through a suitable amplifier, limiter, and discriminator similar to those shown in connection with the Y coordinate signal to energize the moving coil of motor unit 45. Stylus 33 is moved accordingly by arms 36 and 34.

The two component motions along the X and Y axes combine to cause stylus 33 to reproduce the movements of stylus 11.

Figure 2:
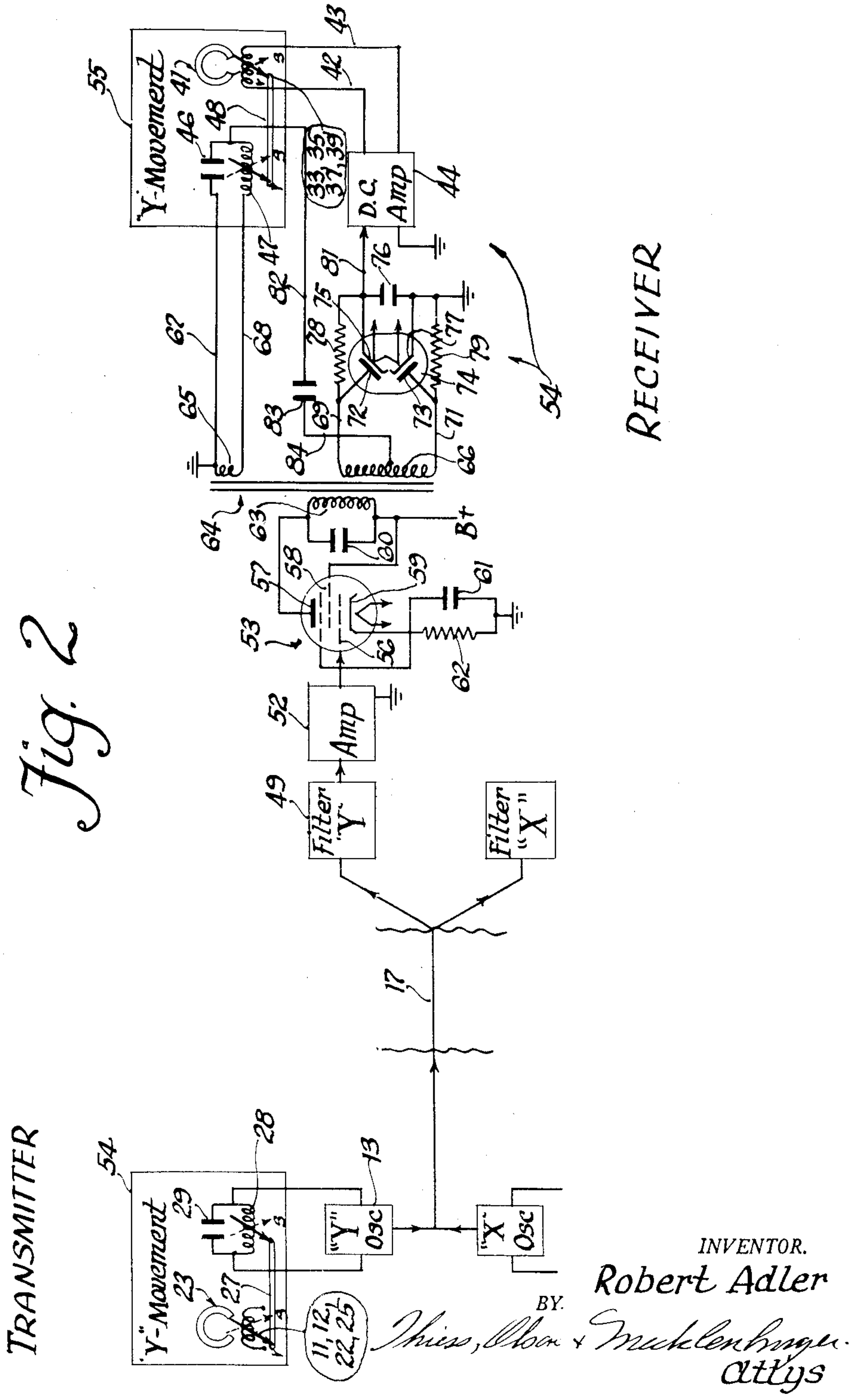
Fig. 2 is a diagrammatic representation similar to Fig. 1 illustrating essential operating components.

Referring more particularly to Fig. 2, the invention will be described in more detail with reference to the Y component of motion alone, it being understood that similar operation occurs for the X component of movement.

Thus stylus 11, arms 12 and 22, shaft 25, motor unit 23, and the tuning circuit composed of inductor 28 and condenser 29 are lumped together and illustrated as Y movement 54, movements of which produce corresponding variations in the frequency of Y oscillator 13. Similarly, stylus 33, links 35 and 37, axle 39, motor unit 41, link 48, inductor 47, and condenser 46 are shown lumped together as comprising the Y movement 55 at the receiver.

Limiter 53 may comprise a five element vacuum tube as shown, wherein the signal from amplifier 52 is fed to the control grid 56. A plate 57 and screen grid 58 are connected respectively to a suitable source of voltage, indicated as B+. Cathode 59 is connected through a condenser 61 and resistor 62 to ground, as shown. The constants of the various components of the limiter and the voltage may be chosen in accordance with well understood principles so that the output from the plate of limiter 53 is substantially constant in amplitude irrespective of the amount of signal supplied to the input, as long as this amount exceeds a predetermined minimum.

Amplifier 44 may be a balanced amplifier of any well known type wherein both positive and negative direct current output voltages are obtainable.

In one form of operation, movements of stylus 11 along the Y axis may produce changes in signal frequency from 2100 to 2300 cycles per second. Signals of these frequencies are passed by filter 49, and after amplification and limiting are fed to the primary 63 of an iron core transformer 64, the primary thereof being tuned by means of condenser 65 to about 2200 cycles per second, i. e. midway between the limits of the band received by this portion of the circuit. The "Q" of winding 63 may be relatively low whereby the frequency band is accepted without substantial discrimination between different frequencies while the tuning aids in obtaining the maximum amount of power transfer and in reducing harmonic content. The secondary side of transformer 64 comprises a winding 65 of relatively few turns, and a winding 66 of a relatively large number of turns, winding 65 being connected by means of conductors 67 and 68 in series circuit with condenser 46 and inductor 47 of Y movement 55. The ends of winding 66 are connected through conductors 69 and 71 to plates 72 and 73 of a double diode rectifier tube 74. Cathode 75 thereof is connected through a condenser 76 of suitable value to ground, and cathode 77 is connected to ground. The diode section 72, 75 is shunted by resistor 78 of suitable value, and the diode section 73, 77 is shunted by a resistor 79 equal to resistor 78, the output from the double diode rectifier being fed through conductor 81 to D. C. amplier 44.

The junction between condenser 46 and inductor 47 is connected by means of a conductor 82, condenser 83, and conductor 84 to a midpoint of winding 66. The combination of winding 65, condenser 46, inductor 47, winding 66, condenser 83 connected as shown, and double diode rectifier 74 with its associated circuit elements form the frequency responsive network or discriminator 54 which, for any fixed setting of inductor 47, produces a direct current voltage at conductor 81 varying from zero in a positive or negative direction, depending upon the frequency input to transformer 64.

Figure 3:
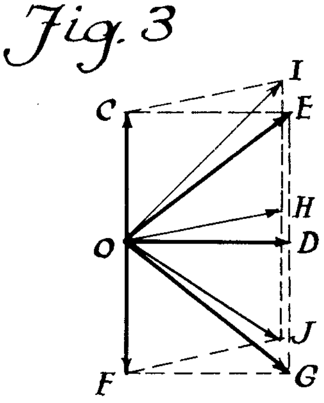
Fig. 3 is a vector diagram illustrating operation of one component of the apparatus.

Referring to Fig. 3 in connection with Fig. 2, the operation of the discriminator may be understood best. Current flowing in winding 63 causes voltages to be induced into windings 65 and 66, which voltages are in phase inasmuch as these windings are closely coupled by virtue of the iron core. The voltage applied to the diode section 72, 75 is the voltage appearing across the upper half of winding 66, and the voltage appearing across condenser 46, condenser 83 being of such a low impedance at the frequencies employed that the voltage of condenser 46 is transmitted without any substantial reduction in magnitude. When condenser 46 and inductor 47 are tuned to resonance at the frequency supplied thereto, these components present a pure resistance to the voltage induced in winding 65. Consequently, at this frequency, the voltage appearing across condenser 46 is 90° out of phase with the voltage across winding 65, and therefore the voltage across condenser 46 is also 90° out of phase with the voltage induced into the upper half of winding 66.

In Fig. 3 the vector OC represents the voltage of the upper half of winding 66, and vector OD represents the voltage across condenser 46 at the resonant frequency. The resultant vector OE represents the voltage applied across the diode element 72, 75. In a similar manner, the voltage appearing across diode element 73, 77 consists of the voltage of the lower half of winding 66, that is, vector OF, and the voltage appearing across condenser 46, that is, vector OD, the resultant of these being the vector OG. The voltages OE and OG are rectified by the respective diodes and the difference between the rectified voltages appears across condenser 76 and is supplied to D. C. amplifier 44. When voltages OE and OG are equal, as is the case when the condenser 46 and inductor 47 are in resonance with the incoming frequency, the difference between the rectified voltages is zero and no voltage is supplied to amplifier 44.

When the frequency supplied to coils 65 and 66 differs from the resonant frequency of the frequency sensitive circuit, i. e. condenser 46 and inductor 47, the phase of the voltage across condenser 46 changes relative to the voltage at resonance. Thus in Fig. 3 the voltage appearing across condenser 46, represented as the vector OH, added to the voltage across the upper half of coil 66, i. e. the vector OC, produces a resultant voltage OI appearing across the diode section 72, 75. The voltage OI is greater than the voltage OE. Likewise, the voltage appearing across diode section 73, 77 under the non-resonant condition as assumed, is the vector sum of the vectors OH and OF, that is, vector OJ, which is smaller than the vector OG. The voltages OI and OJ are rectified by the respective sections of the diode and their difference appears across condenser 76. Inasmuch as vectors OJ and OI differ in magnitude as shown, a positive voltage appears across condenser 76 which is fed to the D. C. amplifier.

The condition described may be representative of an instance where a signal is supplied to the discriminator which has a frequency exceeding the resonant frequency of condenser 46 and inductor 47. When a signal having a frequency lower than the resonant frequency is supplied, a condition the reverse of that described is established; that is, the voltage across diode section 73, 77 is greater than the voltage across diode section 72, 75. Accordingly, the voltage of reverse sign, i. e. negative, appears across condenser 76.

Figure 4:
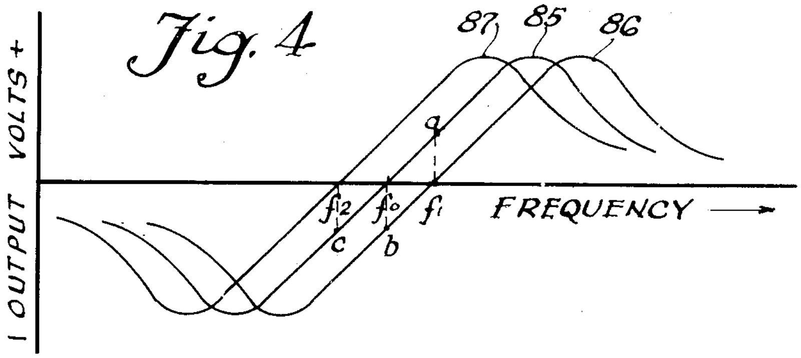
Fig. 4 is a series of curves illustrating the manner of operation of another component of the apparatus.

In Fig. 4 there is shown a series of curves representing discriminator operation for different resonant frequencies of the frequency sensitive circuit 46, 47. Thus if circuit 46, 47 is resonant to a frequency of 2200 cycles per second, the discriminator characteristic may be represented by curve 85. If a frequency of 2200 cycles per second, $f_0$, is supplied to the discriminator, the output thereof is zero; if the frequency is increased the output increases positively as shown, and if the frequency is decreased the output becomes negative, as shown. For a substantial variation in frequency on each side of point $f_0$, the output voltage of the discriminator varies linearly with the input frequency.

If inductor 47 is adjusted to resonate with condenser 46 at a frequency of 2300 cycles per second, $f_1$, the output of the discriminator follows curve 86 as the input frequency to transformer 64 varies. Correspondingly, if the circuit 46, 47 is tuned to a frequency of 2100 cycles per second, $f_2$, operation takes place along curve 87 as the input frequency varies.

The operation of the complete system may best be understood in connection with Figs. 1, 2 and 4.

Assume that stylus 11 at the transmitting end occupies a position *r*, that this position of the stylus corresponds to a Y oscillator signal having a frequency of 2200 cycles per second, and that stylus 33 at the receiver occupies a corresponding position *r*. For this position the resonant frequency of the circuit 46, 47 is 2200 cycles, the output voltage at conductor 81 is zero, and the output from amplifier 44 is zero. The operating point of the discriminator circuit then corresponds to point $f_0$ on curve 85.

Correspondingly, the X oscillator at the transmitter may transmit a signal, for example one of 2800 cycles per second, which will act in a manner similar to that described to position stylus 33 along the X coordinate. Operation of a discriminator, not shown, will take place along a curve similar to 85.

Assume now that stylus 11 is moved from point *r* to point *s*, and that this motion causes the adjustment of inductor 28 to be so altered that Y oscillator produces a frequency of 2300 cycles per second. Likewise, X oscillator at the transmitter for this new position may generate a signal having a frequency of 2900 cycles per second. Reception of the 2300 cycle signal after being filtered, amplified, and limited, causes the discriminator to produce an output voltage corresponding to point *a* on curve 85. This voltage corresponds to the instantaneous mismatch between the new incoming signal frequency of 2300 cycles per second and the resonant frequency of circuit 46, 47 which is still 2200 cycles per second.

The output voltage, *a*, after amplification by amplifier 44, is received by the coil of motor unit 41 causing this unit to initiate motion along the Y axis toward point *s*. As this motion takes place, the inductance of inductor 47 is varied by virtue of mechanical link 48, the change being such as to bring the tuning of circuit 46, 47 up to the frequency of the incoming signal. Since curve 86 represents operation of the discriminator circuit when circuit 46, 47 is tuned to 2300 cycles per second, the output voltage of the discriminator gradually decreases from value *a* to value zero, i. e. point $f_1$ on curve 86. When stylus 33 has reached point *s*, it will have traveled a sufficient distance along the Y axis to adjust inductor 47 to the point where the resonant frequency of circuit 46, 47 is 2300 cycles per second. At this point the output of the discriminator becomes zero.

Assume further that the transmitting stylus 11 is moved from point *s* to point *t*, such movement being entirely along the Y axis, and that this movement corresponds to a change in the signal frequency of the Y oscillator from 2300 cycles per second to 2200 cycles per second. When the 2200 cycle signal is received by discriminator 54, a negative output voltage corresponding to point *b* on curve 86 is produced at conductor 81 inasmuch as the input frequency has now been decreased, and the motor unit 41 receives a negative current. As stylus 33 begins its motion from point *s* to point *t*, it adjusts inductor 47 to bring the tuning of circuit 46, 47 from 2300 cycles per second toward 2200 cycles per second. This process continues until the resonant frequency of circuit 46, 47 is equal to the incoming frequency of 2200 cycles per second, whereupon the output voltage of the discriminator has decreased from value *b* to zero, i. e. point $f_0$ on curve 85, whereupon stylus 33 remains stationary.

Assume still further that the position of stylus 11 at the receiver is changed from point *t* to point *u* along the Y axis, and that this movement causes oscillator Y to generate a frequency of 2100 cycles per second. Since operation is now taking place along curve 85, this input frequency causes a negative output voltage corresponding to point *c* of curve 85 to be developed at conductor 81. Corresponding energization of motor unit 41 causes stylus 33 to move from point *t* toward point *u* thereby adjusting inductor 47 to bring circuit 46, 47 into resonance at the 2100 cycle frequency. When stylus 33 reaches point *u*, circuit 46, 47 is so tuned whereupon the output voltage at conductor 81 becomes zero, i. e. at point $f_2$ on curve 87.

It is apparent that the output voltage produced by the discriminator circuit is proportional to the instantaneous mismatch of the incoming frequency and the resonant frequency of circuit 46, 47, the output voltage being such as to cause motion of the receiving stylus to re-tune circuit 46, 47 so as to reduce the frequency mismatch to zero. This is accomplished without generating any sustained local signal at the receiver, but rather by altering the condition of circuit 46, 47, a passive circuit, relative to the frequency of the incoming signal.

The resonant frequencies of circuit 28, 29 and of circuit 46, 47 are the same when the movements are stationary. Hence, these circuit components preferably are identical.

The amplifiers and filters are disclosed in schematic form only since these units are largely conventional and perform in a well understood manner.

Sufficient additional components are supplied at both the receiver and the transmitter, and switching means (not shown) are provided to change connections between these components in order that transmission may take place from station B to station A. The required components are illustrated in Fig. 1 by dot-dash lines. Accordingly, at station B a Y axis oscillator is shown connected to circuit 46, 47. Filter 49, amplifier 52, and limiter 53, together with the discriminator components, except circuit 46, 47 would be switched out of the circuit. The Y axis oscillator signal is transmitted over conductor 88 and transmission line 17 to station A at which a filter, amplifier, and limiter are provided. The oscillator 13 would be switched out of the circuit. Circuit 28, 29 is then associated with a discriminator substantially identical to that at station B which supplies a signal through a D. C. amplifier to motor unit 23.

Transmission and reception in either direction may therefore be obtained with the circuits 28, 29 and 46, 47 remaining the same and being initially adjusted to be tuned to the same frequency, as pointed out above. By virtue of this, the same circuit serves one function in transmitting and a second function in receiving, thereby reducing the cost of equipment for two-way transmission. The discriminator and other components are substantially identical at the transmitting and receiving ends.

Since no local signals are generated at the station where reception is taking place, there are no undesirable beat frequencies to contend with; furthermore, since the frequencies employed in the discriminators are not difference frequencies as in prior art devices but rather the transmitted signal frequencies themselves, they may easily be made high enough to render their elimination from the discriminator output a simple matter.

Figure 5:
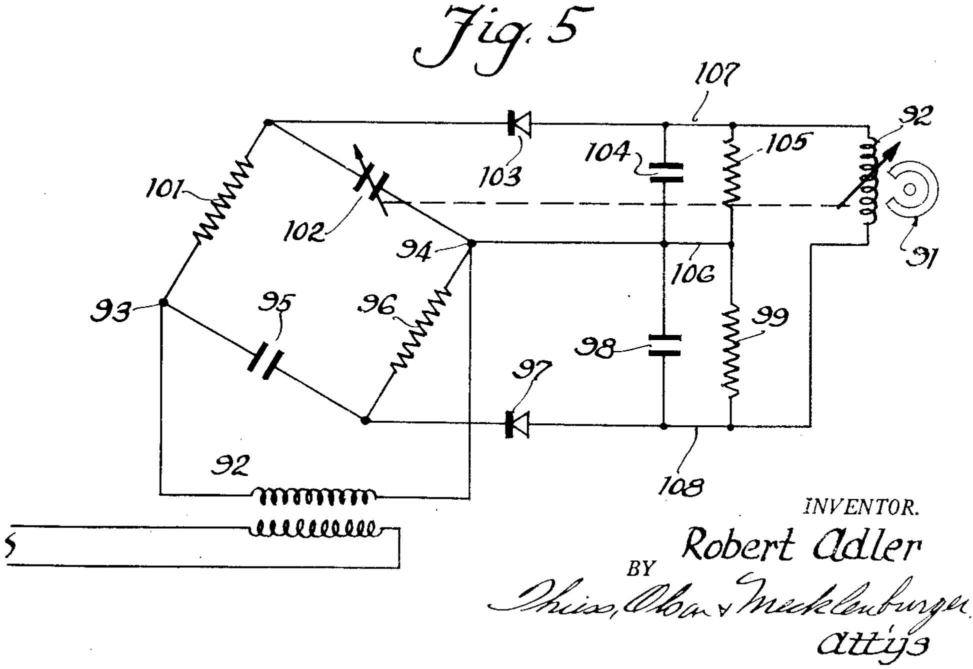
Fig. 5 is a diagrammatic representation of a modified form of the invention.

Referring to Fig. 5, there is shown a modified form of circuit containing a passive frequency sensitive network including a variable element which may be utilized to produce an output voltage varying with input frequency in direction and magnitude without the generation of any local sustained signals.

S may designate a source signal of varying frequency, for example such as one coming from a telemetering device, and motor unit 91 represents a follow-up unit. Signals received by coil 92 of motor unit 91 cause movement in one direction or the other, depending on whether the signal received is positive or negative. A signal of varying frequency from source S is passed through a transformer 92 and produces a voltage across points 93 and 94. Consequently, current flow takes place through condenser 95 and resistor 96. The voltage drop across resistor 96 due thereto is applied across a rectifier 97 through a condenser 98 and a resistor 99 connected in parallel. Likewise, current flow takes place through resistor 101 and variable condenser 102. The voltage across condenser 102 is applied across a diode 103 through a condenser 104 and a resistor 105 connected in parallel.

The constants of condenser 104 and resistor 105 preferably are equal to those of condenser 98 and resistor 99, and the constants of the remaining circuit component are so selected that at some particular frequency the voltage produced across conductors 106 and 107 is equal to that across conductors 106 and 108. These voltages being equal to each other and connected oppositely in the circuit, as shown, the voltage appearing across the coil 92 is zero and no motion of the motor unit takes place.

If the frequency of the incoming signal should change, the voltage drop across resistor 96 will differ from that across condenser 102. If the frequency increases, the voltage drop across condenser 95 decreases, thereby increasing the voltage drop across resistor 96, while the voltage drop across condenser 102 decreases. Consequently, the output voltage produced by rectifier 103 decreases while the output voltage produced by rectifier 97 increases. This causes an unbalance voltage to appear across conductors 107 and 108, with consequent motion of motor unit 91 until the voltage across condenser 102 equals that across resistor 96.

Motor unit 91 is mechanically connected to variable condenser 102 so as to adjust this capacitor in a direction to equalize in magnitude the voltage drop across condenser 102 with the voltage drop across resistor 96. When an increase in received frequency of the signal occurs, the motion of motor unit 91 is such as to decrease the capacitive value of condenser 102, thereby to increase its impedance and consequently the voltage drop thereacross. When this voltage drop equals the drop across resistor 96, the unit is again balanced.

As described in connection with the embodiments of the previous figures, the circuit of Fig. 5 produces an output voltage corresponding to the instantaneous mismatch of the incoming frequency and the characteristics of a local passive frequency sensitive circuit. The motion of the receiver mechanism is such as to produce a balance, again without the generation of any sustained signal locally.

While two forms of discriminator networks have been disclosed, it will be apparent that other types may be constructed, and it is intended by the appended claim to cover the combination of structural components as come within the true spirit and scope of the invention.

Particular values of circuit constants have not been given inasmuch as it will be apparent to those skilled in this art that these may vary widely to produce any desired operative conditions, and it is well known to those skilled in this art how to choose the desired values.

In conventional servo follow-up systems where an error signal is generated which, in its magnitude and polarity, is linearly related to the instantaneous positioning error of the receiver with respect to the transmitter, it is known in the art that the first time derivative of the error signal may be produced by means of a differentiating network and applied to the moving system in order to produce desired damping of this system. It has been shown that in apparatus constructed according to this invention, the frequency responsive network produces an output voltage which is linearly related to the instantaneous positioning error; it is contemplated to produce first time derivatives of this output voltage and employ them in an analogous manner, for the purpose of producing desired damping of the follow-up element.

While particular embodiments of the invention have been shown, it will be understood, of course, that the invention is not limited thereto since many modifications may be made, and it is, therefore, contemplated by the appended claim to cover any such modifications as fall within the true spirit and scope of the invention.

The invention having thus been described, what is claimed and desired to be secured by Letters Patent is:

A continuous audio frequency signal follow-up system receiver including a follow-up element which assumes a position corresponding to the frequency of a transmitted signal comprising, galvanometric means comprising a permanent magnet field member and a moving coil member mounted therein for actuating said follow-up element, a vacuum tube for producing a substantially constant output voltage, an output circuit for said vacuum tube including a transformer having a center tapped secondary winding, a tunable circuit including one fixed and one variable reactance, coupling means to energize said tunable circuit from said output circuit whereby the current through said two reactances is substantially in phase with the voltage across said secondary winding when a voltage of the resonant frequency of said tunable circuit is applied to said output circuit, rectifier means for generating a continuous direct current output corresponding to the vector sums of the voltage across one of the said reactances and the voltages across each half of said secondary winding, respectively, an output circuit for producing a continuous D. C. voltage corresponding to the difference between said direct current outputs for energizing said coil and a link between said follow-up element and said variable reactance.

ROBERT ADLER.

REFERENCES CITED

The following references are of record in the file of this patent:

UNITED STATES PATENTS

| Number | Name | Date |
|---|---|---|
| 2,274,738 | Rosene | Mar. 3, 1942 |
| 2,363,650 | Crosby | Nov. 28, 1944 |
| 2,404,344 | Wild | July 16, 1946 |
| 2,410,983 | Koch | Nov. 12, 1946 |
| 2,441,035 | Rath | May 4, 1948 |
| 2,446,392 | Rey | Aug. 3, 1948 |
| 2,457,790 | Wild et al. | Dec. 28, 1948 |